(12) United States Patent
Yoshimura et al.

(10) Patent No.: US 8,210,692 B2
(45) Date of Patent: Jul. 3, 2012

(54) ILLUMINATING DEVICE, IMAGE DISPLAY DEVICE, AND MIRROR UNIT

(75) Inventors: Taichi Yoshimura, Osaka (JP); Naoya Ishida, Nara (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 449 days.

(21) Appl. No.: 12/575,233

(22) Filed: Oct. 7, 2009

(65) Prior Publication Data

US 2010/0085544 A1    Apr. 8, 2010

(30) Foreign Application Priority Data

Oct. 7, 2008 (JP) .................................. 2008-261064
Dec. 4, 2008 (JP) .................................. 2008-310316

(51) Int. Cl.
*G03B 21/28* (2006.01)
*G02B 7/182* (2006.01)
(52) U.S. Cl. ........... 353/98; 359/871; 359/872; 359/873
(58) Field of Classification Search .............. 353/98–99, 353/122; 359/838, 872–877, 879–881; 362/296.09; 248/466, 476, 485–487, 474, 478–479

See application file for complete search history.

(56) References Cited

U.S. PATENT DOCUMENTS

| 3,879,112 A * | 4/1975 | Hickey ........................... 359/874 |
| 4,096,499 A | 6/1978 | Taguchi et al. |
| 4,456,333 A | 6/1984 | Hewitt |
| 5,128,837 A * | 7/1992 | Hiesinger ........................ 362/12 |
| 5,135,301 A * | 8/1992 | Dreyer et al. .................... 353/85 |
| 5,931,438 A * | 8/1999 | Brouwer ......................... 248/481 |
| 5,984,483 A | 11/1999 | Mazurek et al. |
| 7,628,510 B2 * | 12/2009 | Chen et al. ..................... 362/241 |
| 2010/0085543 A1* | 4/2010 | Yoshimura et al. ............. 353/98 |
| 2010/0110396 A1* | 5/2010 | Kanbara et al. ................ 353/119 |

FOREIGN PATENT DOCUMENTS

| DE | 2637404 | 2/1977 |
| JP | 02-257192 A | 10/1990 |
| JP | 04-104583 A | 4/1992 |
| JP | 11103468 | 4/1999 |
| JP | 2005221762 | 8/2005 |

OTHER PUBLICATIONS

Extended European Search Report from corresponding case, dated Nov. 27, 2009.

* cited by examiner

*Primary Examiner* — Tony Ko
*Assistant Examiner* — Jori S Reilly-Diakun
(74) *Attorney, Agent, or Firm* — NDQ&M Watchstone LLP

(57) ABSTRACT

A mirror unit of the present invention includes a base member constituted of an upper plate portion, a lower plate portion, a connecting portion connecting the upper plate portion and the lower plate portion, and wall portions. A mirror holder for holding a mirror is pivotally supported between the upper plate portion and the lower plate portion. A recess is formed in the wall portions. An adjuster is mounted in the recess. Screw holes extend through the recess, and adjusting screws are engaged in the screw holes. Lifting amounts of plate portions of the adjuster can be adjusted by the adjusting screws. The tilt angle of the mirror is adjusted so that the mirror is properly tilted with respect to a light flux from either one of two lamps.

9 Claims, 7 Drawing Sheets

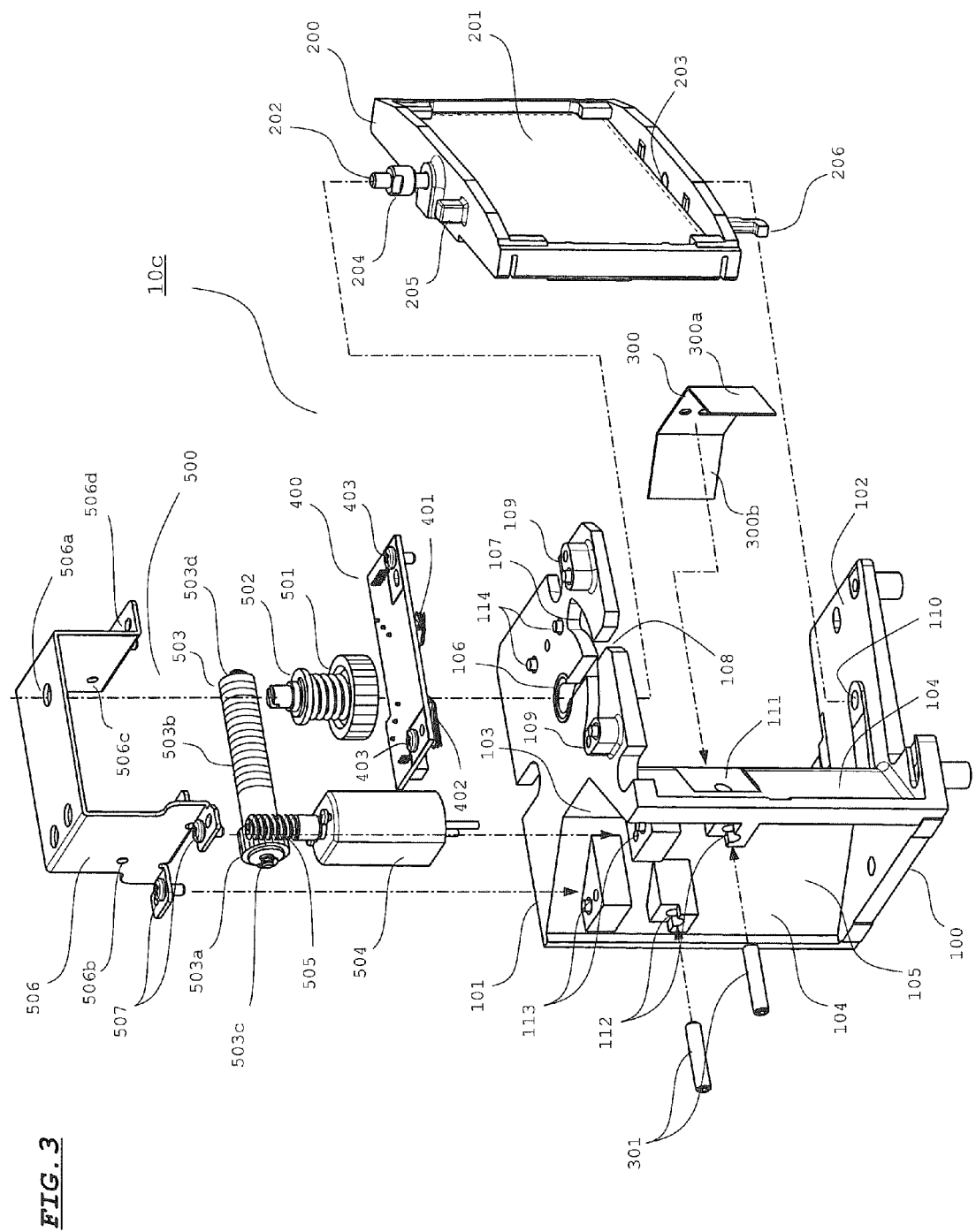

US 8,210,692 B2

ILLUMINATING DEVICE, IMAGE DISPLAY DEVICE, AND MIRROR UNIT

This application claims priority under 35 U.S.C. Section 119 of Japanese Patent Application No. 2008-261064 filed Oct. 7, 2008, entitled "ILLUMINATING DEVICE, IMAGE DISPLAY DEVICE, AND MIRROR UNIT", and Japanese Patent Application No. 2008-310316 filed Dec. 4, 2008, entitled "ILLUMINATING DEVICE, IMAGE DISPLAY DEVICE, AND MIRROR UNIT". The disclosures of the above applications are incorporated herein by reference.

BACKGROUND OF THE INVENTION

1. Field of the Invention

The present invention relates to an illuminating device, an image display device loaded with the illuminating device, and a mirror unit for use in the illuminating device, and in particular is preferably used in an arrangement capable of switching a light source to be used.

2. Disclosure of Related Art

Nowadays, a projection image display device (hereinafter, referred to as a "projector") for enlarging and projecting an image onto a screen has been commercialized and widely spread. Generally, in the projector, a lamp is used as a light source, and light from the lamp is modulated by an imager for being projected onto a screen.

In use of the projector, if the lamp is short-circuited during a projection, display of an image is interrupted. To avoid such a drawback, there is proposed an arrangement of preparing two lamps in advance. If one of the lamps in use is short-circuited, the other lamp will be used.

In the above arrangement, the two lamps are disposed opposite to each other, and a mirror unit is disposed between the lamps. The mirror unit has a pivotable mirror. When a first lamp is used, the mirror is positioned to a first position facing the first lamp; and when a second lamp is used, the mirror is positioned to a second position facing the second lamp.

In the case where the lamps are switched over by using the mirror, it is necessary to tilt the mirror at a proper angle with respect to light from the corresponding lamp. Specifically, if the tilt angle of the mirror is displaced from a proper angle, unevenness of colors and deterioration of illuminance may occur in a projected image. In view of this, in the above arrangement, it is necessary to precisely position the mirror to the first position or the second position.

SUMMARY OF THE INVENTION

A first aspect of the present invention is directed to an illuminating device. The illuminating device according to the first aspect includes: a first light source for emitting first light; a second light source for emitting second light, and disposed at such a position as to overlap the second light with the first light; and a mirror unit for pivotally supporting a mirror. The mirror is disposed at such a position that the first light and the second light are overlapped with each other. The mirror is pivotally moved between a first position where the first light is reflected in a targeted direction and a second position where the second light is reflected in the targeted direction. The mirror unit includes: a base member having an upper plate portion, a lower plate portion, and a connecting portion for connecting the upper plate portion and the lower plate portion; a mirror holder for holding the mirror, and pivotally supported between the upper plate portion and the lower plate portion; an adjuster mounted in an elastically displaceable manner on a side surface of the connecting portion on the side of the mirror holder; and an adjusting screw engaged with the connecting portion in such a manner that a distal end of the adjusting screw comes into contact with an elastic displacement portion of the adjuster. The connecting portion has two wall portions for restricting a pivotal movement of the mirror holder. The adjuster is mounted on the connecting portion in such a manner that the elastic displacement portion is positioned with respect to the two wall portions.

In the illuminating device according to the first aspect, a displacement amount of the elastic displacement portion can be adjusted with respect to the corresponding wall portion by adjusting the adjusting screw. A pivotal movement of the mirror holder is restricted by the elastic displacement portion. Accordingly, the position of the mirror holder where the pivotal movement thereof is restricted can be finely adjusted by adjusting the adjusting screw. Thus, in the illuminating device according to the first aspect, the mirror can be properly positioned to the first position or the second position by adjusting the adjusting screw.

A second aspect of the present invention is directed to an image display device. The image display device according to the second aspect includes: the illuminating device according to the first aspect; an imager for modulating illumination light generated by the illuminating device in accordance with an image signal; and a light guiding optical system for guiding the illumination light from the illuminating device to the imager. In the image display device according to the second aspect, the mirror can be properly positioned to the first position or the second position. Accordingly, the quality of a projected image can be enhanced.

A third aspect of the present invention is directed to a mirror unit. The mirror unit according to the third aspect has the same arrangement as the arrangement of the mirror unit included in the illuminating device according to the first aspect. Accordingly, in the mirror unit according to the third aspect, similarly to the effect described in the first aspect, the mirror can be properly positioned to the first position or the second position.

BRIEF DESCRIPTION OF THE DRAWINGS

These and other objects, and novel features of the present invention will become more apparent upon reading the following detailed description of the embodiment along with the accompanying drawings.

FIG. 3 is an exploded perspective view showing an arrangement of a mirror unit in the embodiment.

Figure 1:
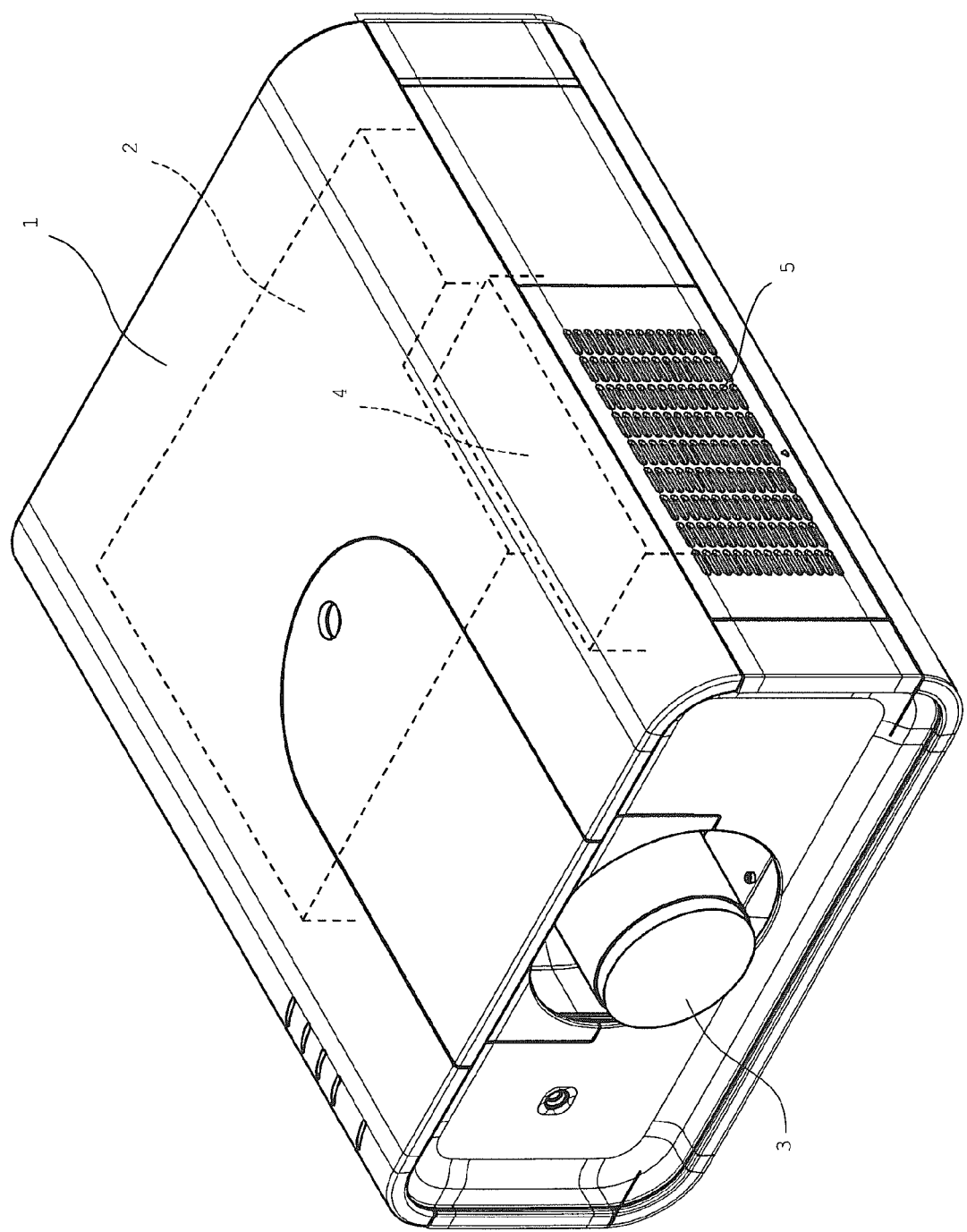
FIG. 1 is a perspective view showing an appearance of a projector in an embodiment of the present invention.

The drawings are provided solely for describing the present invention, and do not limit the scope of the present invention.

DESCRIPTION OF PREFERRED EMBODIMENTS

In the following, an arrangement of a projector in an embodiment of the present invention is described referring to the drawings.

FIG. 1 is a diagram (external perspective view) showing an arrangement of a projector in an embodiment of the present invention. The projector includes a cabinet 1. The cabinet 1 has a substantially rectangular parallelepiped shape with a small size in height direction thereof and a large size in depth direction thereof. An air inlet 5 is formed on the side of the cabinet 1 to draw the external air into the cabinet 1.

The cabinet 1 is internally provided with an optical engine 2, a projection lens 3, and a cooling device 4. The optical engine 2 generates light (image light) modulated by an image signal. The projection lens 3 is mounted on the optical engine 2, with a front part of the projection lens 3 being exposed through a front wall of the cabinet 1. Image light generated by the optical engine 2 is projected onto a screen plane disposed in front of the projector through the projection lens 3. The cooling device 4 draws in the external air through the air inlet 5, and supplies the external air to the optical engine 2 as cooling air.

Figure 2:
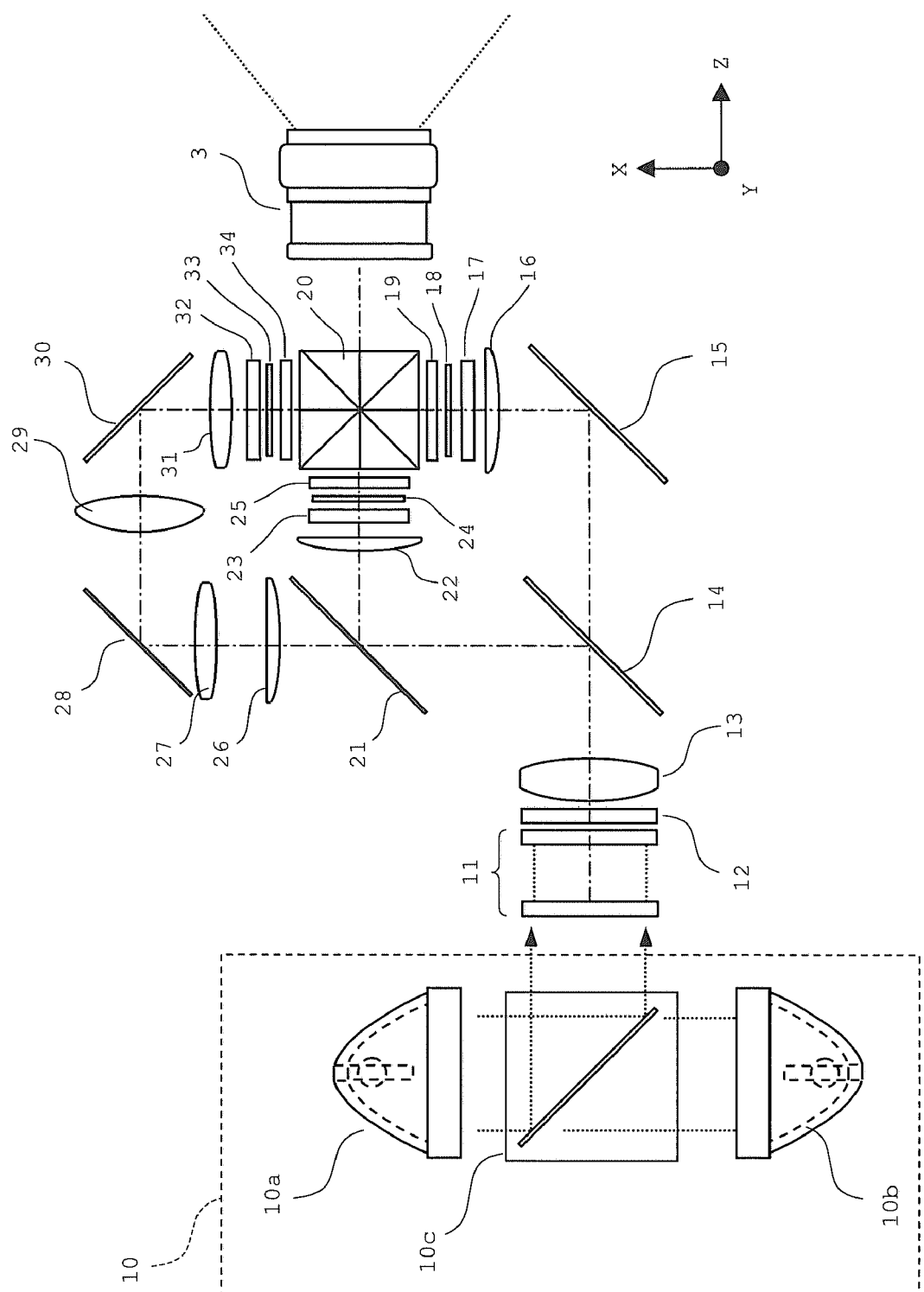
FIG. 2 is a diagram showing an arrangement of an optical engine in the embodiment.

FIG. 2 is a diagram showing an arrangement of the optical engine 2. Referring to FIG. 2, the reference numeral 10 indicates an illuminating device having two lamps 10a and 10b, and a mirror unit 10c. The lamp 10a, 10b is constituted of an ultrahigh pressure mercury lamp, a metal halide lamp, a xenon lamp, or a like device. Light from the lamp 10a, 10b is emitted as substantially parallel light by a function of a reflector.

The mirror unit 10c has a mirror which can pivotally move parallel to the X-Z plane in FIG. 2. The mirror is pivotally moved so that light from the lamp 10a is guided to a fly-eye integrator 11 at the time of activation of the lamp 10a, and light from the lamp 10b is guided to the fly-eye integrator 11 at the time of activation of the lamp 10b. The arrangement of the mirror unit 10c will be described later referring to FIGS. 3, 4A, 4B, 4C, 5A, and 5B.

Light from the illuminating device 10 enters into a PBS (polarized beam splitter) array 12 and a condenser lens 13 via the fly-eye integrator 11. The fly-eye integrator 11 has a first fly-eye lens unit and a second fly-eye lens unit each constituted of fly-eye lenses. The fly-eye integrator 11 imparts an optical function to light to be entered from the illuminating device 10 to make uniform a light amount distribution with respect to liquid crystal panels 18, 24, and 33.

The PBS array 12 is formed by arranging a plurality of PBSs and half wavelength plates in an array to align polarization directions of light entered from the fly-eye integrator 11 in one direction. The condenser lens 13 imparts a condensing function to light entered from the PBS array 13. Light transmitted through the condenser lens 13 enters into a dichroic mirror 14.

The dichroic mirror 14 transmits solely light in a blue wavelength band (hereinafter, referred to as "B light"), and reflects light in a red wavelength band (hereinafter, referred to as "R light"), and light in a green wavelength band (hereinafter, referred to as "G light"), out of the light entered from the condenser lens 13. The B light transmitted through the dichroic mirror 14 is reflected on a mirror 15 and enters into a condenser lens 16.

The condenser lens 16 imparts an optical function to the B light so that the B light enters into the liquid crystal panel 18 as substantially parallel light. The B light transmitted through the condenser lens 16 enters into the liquid crystal panel 18 via an entering-side polarizer 17. The liquid crystal panel 18 is driven in accordance with an image signal for blue to modulate the B light depending on a driven state of the liquid crystal panel 18. The B light modulated by the liquid crystal panel 18 enters into a dichroic prism 20 via an output-side polarizer 19.

Out of the light reflected on the dichroic mirror 14, the G light is reflected on a dichroic mirror 21 and enters into a condenser lens 22. The condenser lens 22 imparts an optical function to the G light so that the G light enters into the liquid crystal panel as substantially parallel light. The G light transmitted through the condenser lens 22 enters into the liquid crystal panel 24 via an entering-side polarizer 23. The liquid crystal panel 24 is driven in accordance with an image signal for green to modulate the G light depending on an driven state of the liquid crystal panel 24. The G light modulated by the liquid crystal panel 24 enters into the dichroic prism 20 via an output-side polarizer 25.

The R light transmitted through the dichroic mirror 21 enters into a condenser lens 26. The condenser lens 26 imparts an optical function to the R light so that the R light enters into the liquid crystal panel 33 as substantially parallel light. The R light transmitted through the condenser lens 26 propagates along an optical path constituted of relay lenses 27, 29, and 31, and mirrors 28 and 30 for regulating an optical path length, and enters into the liquid crystal panel 33 via an entering-side polarizer 32. The liquid crystal panel 33 is driven in accordance with an image signal for red to modulate the R light depending on a driven state of the liquid crystal panel 33. The R light modulated by the liquid crystal panel 33 enters into the dichroic prism 20 via an output-side polarizer 34.

The dichroic prism 20 combines the B light, the G light, and the R light modulated by the liquid crystal panels 18, 24, and 33 for incidence into a projection lens 35. The projection lens 35 includes a lens group for forming an image of projected light onto a projection plane, and an actuator for displacing a part of the lens group in an optical axis direction to adjust a zoom state and a focus state of the projected image. The light combined by the dichroic prism 20 is enlarged and projected onto a screen through the projection lens 3.

Next, an arrangement of the mirror unit 10c is described referring to FIGS. 3, 4A, 4B, 4C, 5A, and 5B.

FIG. 3 is an exploded perspective view of the mirror unit 10c. As shown in FIG. 3, the mirror unit 10c includes a base member 100, a mirror holder 200, an adjuster 300, a substrate 400, and a driving section 500.

The base member 100 includes an upper plate portion 101, a lower plate portion 102, a back plate portion 103, and two wall portions 104. The upper plate portion 101, the lower plate portion 102, the back plate portion 103, and the two wall portions 104 are integrally formed. A recess 105 communicating with the upper plate portion 101 is arranged between the two wall portions 104.

The upper plate portion 101 is formed with a bearing hole 106 to be engaged with a bearing 204 of the mirror holder 200, an arc-shaped guide hole 107 along which a projection 205 of the mirror holder 200 is guided, and a linear guide hole 108 communicating with the bearing hole 106 from a side surface of the upper plate portion 101. Two bosses 109 each having a boss and a screw hole are formed on the upper surface of the upper plate portion 108. The substrate 400 is mounted on the two bosses 109.

The lower plate portion 102 is aligned in parallel to the upper plate portion 101. A shaft hole 110 to be engaged with a shaft 203 of the mirror holder 200 is formed in the lower plate portion 102 at a position coaxial with the bearing hole 106 of the upper plate portion 101.

A recess 111 having a contour slightly larger than the contour of the adjuster 300 is formed in the inner surfaces of the two wall portions 104 and the back plate portion 103. The adjuster 300 is fitted and screw-fastened in the recess 111. Screw holes 112 to be engaged with adjusting screws 301 are formed on the outer surfaces of the two wall portions 104, respectively. The screw holes 112 extend through the recess 111 formed on the inner surfaces of the two wall portions 104, respectively. As shown in FIG. 3, threading directions of the two adjusting screws 301 corresponding to the two screw holes 112 are identical to each other. In other words, the two screw holes 112 are threaded in the directions identical to each other in the outer surfaces of the two wall portions 104.

Further, two bosses 113 each having a boss and a screw hole are formed on the outer surfaces of the two wall portions 104, respectively. A cover 506 is mounted on the two bosses 113.

The two wall portions 104 are configured in such a manner that the inner surfaces thereof are tilted at about 45° with respect to propagating directions of light from the lamps 10a and 10b, respectively, in the case where the mirror unit 10c is mounted in the optical engine shown in FIG. 2. Further, the two screw holes 112 are threaded at an angle of 45° with respect to the inner surfaces of the two wall portions 104, respectively.

A mirror 201 is mounted on the mirror holder 200. A shaft 202 protrudes from the upper surface of the mirror holder 200. Likewise, the shaft 203 protrudes from the lower surface of the mirror holder 200 at a position coaxial with the shaft 202. A bearing 204 is pivotally supported on the shaft 202 about an axis of the bearing hole 106. A projection 205 is formed on the upper surface of the mirror holder 200. The projection 205 is operable to come into contact with a detection switch 401 or 402 mounted on the lower surface of the substrate 400 to turn on the detection switch 401 or 402, when the mirror holder 200 is set to a corresponding pivotal end position. A hook portion 206 is formed on the lower surface of the mirror holder 200.

The adjuster 300 is made of a thin resilient metal plate, and has such a shape that right and left plate portions 300a and 300b thereof are slightly closer to each other, as compared with the shape defined by the inner surfaces of the two wall portions 104 and the back plate portion 103.

The two detection switches 401 and 402 are mounted on the lower surface of the substrate 400. The substrate 400 is mounted on the bosses 109 by screws 403 in a state that projections of the bosses 109 are engaged in holes formed in two corners of the substrate 400, respectively. The detection switch 401 or 402 is turned on in response to being pressed by the projection 205 on the upper surface of the mirror holder 200, when the mirror holder 200 is set to a corresponding pivotal end position.

The driving section 500 includes a gear 501 equipped with a torque limiter 502, a gear 503, a motor 504, a gear 505 mounted on a drive shaft of the motor 504, and the cover 506. The gear 503 has two gear portions 503a and 503b, and shafts 503c and 503d are mounted on right and left ends of the gear 503. The cover 506 is formed with a shaft hole 506a to be engaged with a shaft 502a (see FIG. 4C) of the torque limiter 502, and shaft holes 506b and 506c to be engaged with the shafts 503c and 503d of the gear 503, respectively. The cover 506 is mounted on the bosses 113 by screws 507. In mounting the cover 506, projections 114 formed on the upper surface of the upper plate portion 101 are engaged in two holes 506d formed in the cover 506, respectively.

In assembling the mirror unit 10c, first, the adjuster 300 is mounted in the recess 111. Specifically, a middle portion of the adjuster 300 is screw-fastened to the back plate portion 103 in a state that the adjuster 300 is fitted in the recess 111. As described above, the adjuster 300 has such a shape that the right and left plate portions 300a and 300b are slightly closer to each other, as compared with the shape defined by the inner surfaces of the two wall portions 104 and the back plate portion 103. Accordingly, screw-fastening the middle portion of the adjuster 300 in the recess 111 presses the adjuster 300 against the recess 111 by flexure of the right and left plate portions 300a and 300b. In this state, the surface of the adjuster 300 is rendered substantially flush with the inner surfaces of the two wall portions 104 and the back plate portion 103.

Three holes are formed in the middle portion of the adjuster 300 to be vertically aligned with each other. The adjuster 300 is screw-fastened using the middle hole of the three holes. Projections (not shown) formed on the recess 111 are engaged in the upper hole and the lower hole, respectively. The adjuster 300 is positioned with respect to the recess 111 by the engagement.

Thereafter, the two adjusting screws 301 are engaged in the screw holes 112. As the rotations of the adjusting screws 301 are advanced, the tips of the adjusting screws 301 come into contact with the inner surface of the adjustor 300. Then, as the rotations of the adjusting screws 301 are further advanced, the adjustor 300 is flexed while being pressed by the tips of the adjusting screws 301. Adjusting the rotation amounts of the two adjusting screws 301 enables to adjust displacement amounts of the right and left plate portions 300a and 300b.

Then, the mirror holder 200 is mounted on the base member 100 as follows. Specifically, the projection 205 is guided through the guide hole 108 formed in the upper plate portion 101 along the guide hole 107, and the shaft 202 at a lower portion of the bearing 204 is guided to the bearing hole 106 through the guide hole 108. Then, the shaft 203 is engaged in the shaft hole 110 of the lower plate portion 102 by moving the mirror holder 200 downwardly, and the bearing 204 is engaged in the bearing hole 106. Accordingly, the mirror holder 200 is pivotally mounted between the upper plate portion 101 and the lower plate portion 102.

Thereafter, the driving section 500 is mounted. First, the shaft 202 of the mirror holder 200 is mounted on the torque limiter 502. Then, the motor 504 is mounted on the back plate portion 103 in such a manner that the motor 504 is housed in the recess 105. Further, the gear 503 is mounted in the cover 506 by engaging the shafts 503c and 503d in the shaft holes 506b and 506c, respectively. After that, the cover 506 is fastened to the bosses 113 by the screws 507 so that the gear portions 503a and 503b are respectively engaged with the gears 505 and 501.

Thereafter, the substrate 400 is screw-fastened to the bosses 109. In this state, the two detection switches 401 and 402 mounted on the substrate 400 are positioned near each end of the guide hole 107.

Figure 4B:
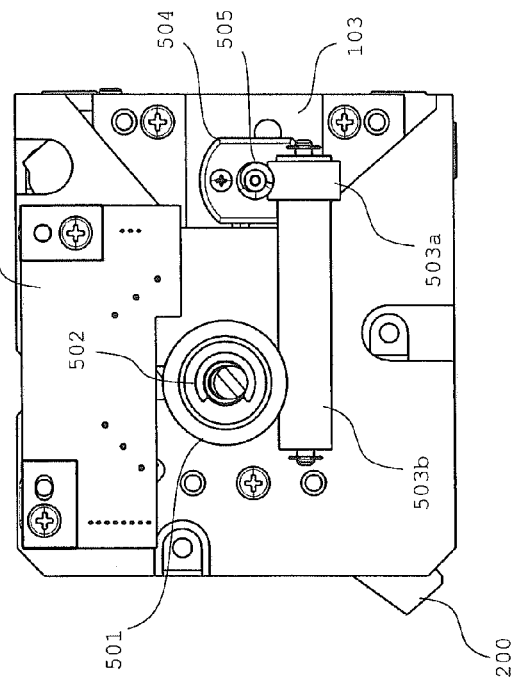
FIGS. 4A and 4B are a bottom plan view and a top plan view showing an arrangement of the mirror unit in the embodiment, respectively.
Figure 4A:
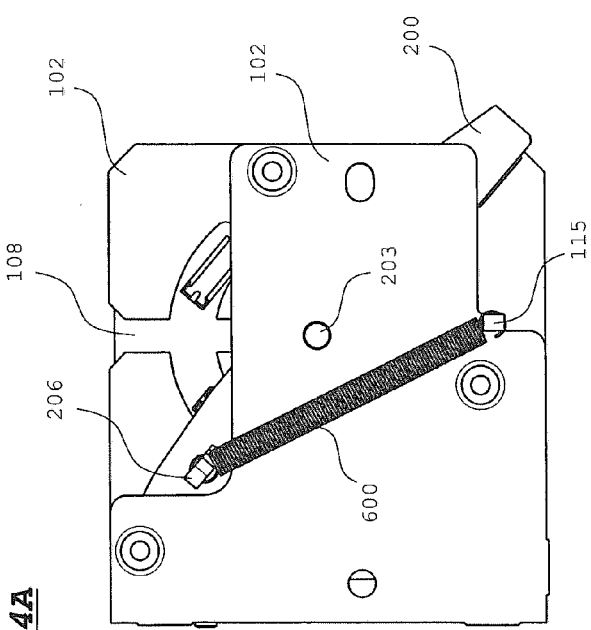

Finally, as shown in FIG. 4A, a coil spring 600 is mounted on the backside surface of the lower plate portion 102. FIGS. 4A and 4B are respectively a bottom plan view and a top plan view of the mirror unit in an assembled state. To simplify the description, the cover 506 is not illustrated in FIG. 4B.

The coil spring 600 is mounted on the mirror unit 10c in a manner that both ends thereof are latched together with the hook portion 206 formed on the lower surface of the mirror holder 200 and a hook portion 115 formed on the backside surface of the lower plate portion 102, respectively. The positional relation between the hook portion 115 and the shaft 203 of the mirror holder 200 is as shown in FIG. 4A.

In a state shown in FIG. 4A, the hook portion 206 is pulled by the coil spring 600, and the mirror holder 200 is subjected to a counterclockwise force by the coil spring 600. Accordingly, the backside surface of the mirror holder 200 is pressed against one of the wall portions 104. In this state, if the plate portion 300a of the adjuster 300 is lifted upwardly from the recess 111 by the corresponding adjusting screw 301, the backside surface of the mirror holder 200 is pressed against the plate portion 300a.

When the mirror holder 200 is pivotally rotated clockwise from the state shown in FIG. 4A, and the position of the hook portion 206 passes a straight line connecting the hook portion 115 and the axis of the shaft 203, the mirror holder 200 is subjected to a clockwise force by the coil spring 600. Thereafter, when the mirror holder 200 is pivotally rotated clockwise, and the backside surface of the mirror holder 200 comes into contact with the other one of the wall portions 104, the backside surface of the mirror holder 200 is pressed against the other one of the wall portions 104 by a tension force of the coil spring 600. In this state, if the plate portion 300b of the adjuster 300 is lifted upwardly from the recess 111 by the corresponding adjusting screw 301, the backside surface of the mirror holder 200 is pressed against the plate portion 300b.

The pivotal end position of the mirror holder 200 may be adjusted by a lifting amount of the plate portion 300a, 300b by the corresponding adjusting screw 301. In the case where the mirror unit 10c is mounted in the optical engine shown in FIG. 2, the lifting amounts of the plate portions 300a and 300b by the respective corresponding adjusting screws 301 are adjusted so that both of the light from the lamps 10a and 10b are properly directed to the fly-eye integrator 11.

Figure 4C:
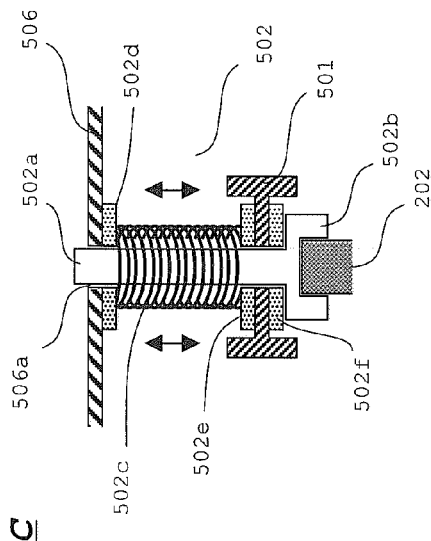
FIG. 4C is a sectional view showing an arrangement of a torque limiter in the embodiment.

FIG. 4C is a sectional view showing an arrangement of the torque limiter 502. FIG. 4C is a sectional view taken along a line A-A', showing the torque limiter 502 and peripheral parts thereof in an assembled state shown in FIG. 5A.

The torque limiter 502 includes a shaft 502a having a bearing 502b at a lower end thereof, a coil spring 502c, and three washers 502d, 502e, and 502f. The bearing 502b is engaged with the shaft 202 of the mirror holder 200. An upper end of the shaft 202 has such a shape that a part of a cylindrical column is cut away into a planar shape, and the inner surface of the bearing 502b has such a shape as to be engaged with the upper end of the shaft 202.

The gear 501 has an H-shape in section, and a hole slightly larger than the shaft 502a is formed in the center of the gear 501. The shaft 502a is received in the hole of the gear 501. The gear 501 is vertically interposed between the washers 502e and 502f. An upper end of the shaft 502a is engaged in the shaft hole 506a of the cover 506, as described above. The coil spring 502c is mounted between the cover 506 and the washer 502e via the washer 502d. The coil spring 502c is mounted between the washers 502d and 502e in a compressed state. Accordingly, the gear 501 is pressed against the upper surface of the bearing 502b by the coil spring 502c.

In the above arrangement, when the gear 501 is rotated, the shaft 502a is rotated by a frictional force between the gear 501 and the washer 502e, and a frictional force between the gear 501 and the washer 502f. Accordingly, the shaft 202 engaged with the bearing 502b is pivotally rotated, and the mirror holder 200 is pivotally rotated accompanied by the pivotal rotation of the shaft 202. On the other hand, for instance, in the case where the gear 501 is further rotated after the backside surface of the mirror holder 200 comes into contact with the adjuster 300, the gear 501 slips with respect to the washer 502e and the washer 502f, and solely the gear 501 is rotated. Thus, the torque limiter 502 transmits a driving force of the gear 501 to the shaft 202 exclusively in the range of a static frictional force between the gear 501 and the washer 502f.

Figure 5A:
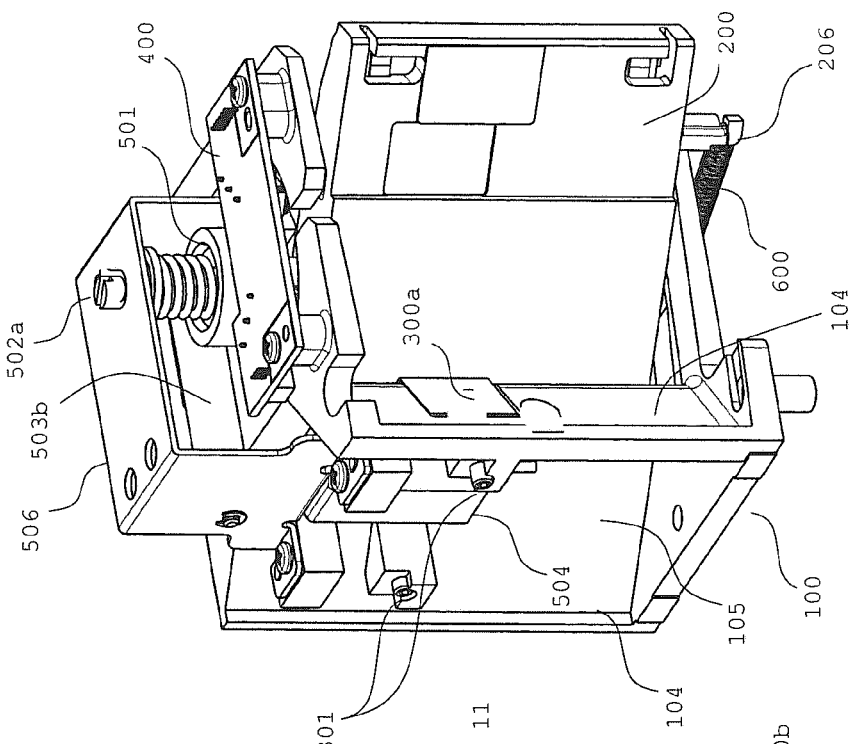
FIGS. 5A and 5B are perspective views showing an arrangement of the mirror unit in the embodiment.
Figure 5B:
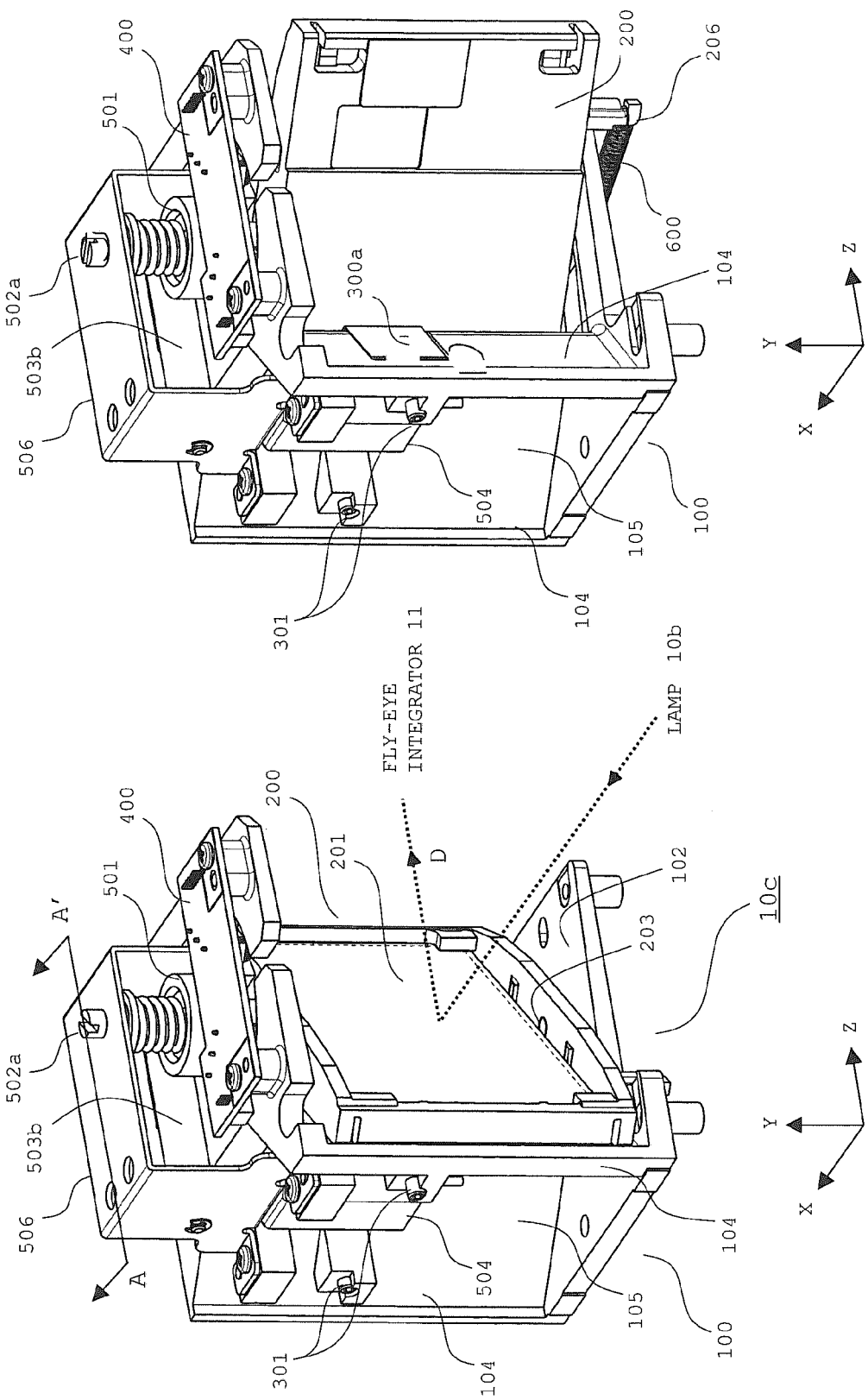

FIGS. 5A and 5B are diagrams showing an arrangement of the mirror unit 10c in an assembled state. As shown in FIG. 5A, the mirror unit 10c is constructed in such a manner that the mirror 201 faces the lamp 10b when the backside surface of the mirror holder 200 is contacted with the plate portion 300a of the adjuster 300. In this state, light from the lamp 10b is reflected on the mirror 201 in D direction, and guided to the fly-eye integrator 11. In the state shown in FIG. 5A, the mirror 201 is tilted at about 45° in X-Z plane direction with respect to the propagating direction of light from the lamp 10b. Further, the shafts 202 and 203 of the mirror holder 200 are aligned in parallel to Z axis.

As shown in FIG. 5B, when the mirror holder 200 is pivotally rotated from the above state to a position where the backside surface of the mirror holder 200 is contacted with the plate portion 300b (not shown in FIG. 5B) of the adjuster 300, the mirror 201 is positioned to a position facing the lamp 10a. Similarly to the state shown in FIG. 5A, in this state, light from the lamp 10a is reflected on the mirror 201 in D direction, and guided to the fly-eye integrator 11. In this state, the mirror 201 is tilted at about 45° in X-Z plane direction with respect to the propagating direction of light from the lamp 10a.

As described above, the reflecting direction of light from the mirror 201 can be adjusted by adjusting the adjusting screws 301. In the case where the mirror unit 10c is mounted in the optical engine 2, the adjusting screws 301 are adjusted so that both of the light from the lamps 10a and 10b is directed in D direction and properly enters into the fly-eye integrator 11.

In the case where the mirror holder 200 is pivotally rotated from the state shown in FIG. 5A to the state shown in FIG. 5B, the motor 504 is continued to be driven for a predetermined period after the detection switch 401 on the substrate 400 is turned on. If the mirror holder 200 is contacted with the plate portion 300b of the adjuster 300 during the period, the torque limiter 502 makes idle rotation thereafter, and the mirror holder 200 is pressed against the plate portion 300b of the adjuster 300. By this driving control, the mirror holder 200 is securely positioned to the position in contact with the plate portion 300b.

Similarly to the above, in the case where the mirror holder 200 is pivotally rotated from the state shown in FIG. 5B to the state shown in FIG. 5A, the motor 504 is continued to be driven for a predetermined period after the detection switch 402 on the substrate 400 is turned on. Accordingly, the mirror holder 200 is securely positioned to the position in contact with the plate portion 300a.

As described above, according to the embodiment, since the lifting amounts of the plate portions 300a and 300b of the adjuster 300 can be adjusted by the adjusting screws 301, respectively, the tilt angle of the mirror 201 can be easily adjusted so that the mirror 201 is tilted at a proper angle with respect to light from the lamp 10a, 10b. Thus, the mirror 201 can be properly positioned to the position where the lamp 10a is used, or the position where the lamp 10b is used, with a simplified operation.

Further, the adjustment can be realized with a very simple arrangement constituted of one adjuster 300 and two adjusting screws 301. Furthermore, the adjustment can be performed solely by adjusting the adjusting screws 301 from one direction (Z axis direction in FIGS. 5A and 5B). Thus, the positional adjustment of the mirror 201 can be smoothly performed with a simplified operation. For instance, in this embodiment, the two adjusting screws 301 can be individually adjusted by using a jig, as far as there can be secured a space having a width substantially the same as the width of the mirror unit 10c in X axis direction, in a direction opposite to the Z axis direction indicated by the arrow in FIGS. 5A and 5B, in a state that the mirror unit 10c is mounted.

The above positional adjustment of the mirror is performed at the time of shipping the product by e.g. performing the following operation. Specifically, the lamp 10a is activated to project an image, while pressing the mirror holder 200 against the plate portion 300a. Then, the adjusting screw 301 corresponding to the plate portion 300a is adjusted to optimize the projected image. After the adjustment of the plate portion 300a is completed, the lamp 10a is activated to project an image, while pressing the mirror holder 200 against the plate portion 300b. Then, the adjusting screw 301 corresponding to the plate portion 300b is adjusted to optimize the projected image. In performing the adjustment, the mirror holder 200 may be pressed against the plate portion 300a or 300b merely by using a resilient force of the coil spring 600. Further alternatively, in performing the adjustment, the mirror holder 200 may be pressed against the plate portion 300a or 300b by driving the motor 504 while idly rotating the torque limiter 502.

Furthermore, according to the embodiment, since the mirror holder 200 is pivotally supported on the integrally molded base member 100, positional displacement or axial displacement of the mirror holder 200 is less likely to occur, as compared with an arrangement that the base member 100 is constituted of a plurality of constituent parts, and the mirror holder 200 is mounted on the base member 100, while assembling the constituent parts into the base member 100. Accordingly, from this viewpoint, the mirror 201 can be also precisely positioned to the position corresponding to the lamp 10b shown in FIG. 5A, or the position corresponding to the lamp 10a shown in FIG. 5B.

The embodiment of the present invention has been described as above, but the present invention is not limited to the foregoing embodiment. Further, the embodiment of the present invention may be modified in various ways other than the above.

For instance, in the embodiment, the recess 105 is communicated solely with the upper plate portion 101. Alternatively, the recess 105 may also be communicated with the lower plate portion 102. In the embodiment, the transmission mechanism constituted of various gears, and the substrate 400 are mounted on the upper plate portion 101. Alternatively, the recess 105 may extend to the lower plate portion 102, and the transmission mechanism and the substrate 400 may be mounted on the lower plate portion 102.

Figure 6:
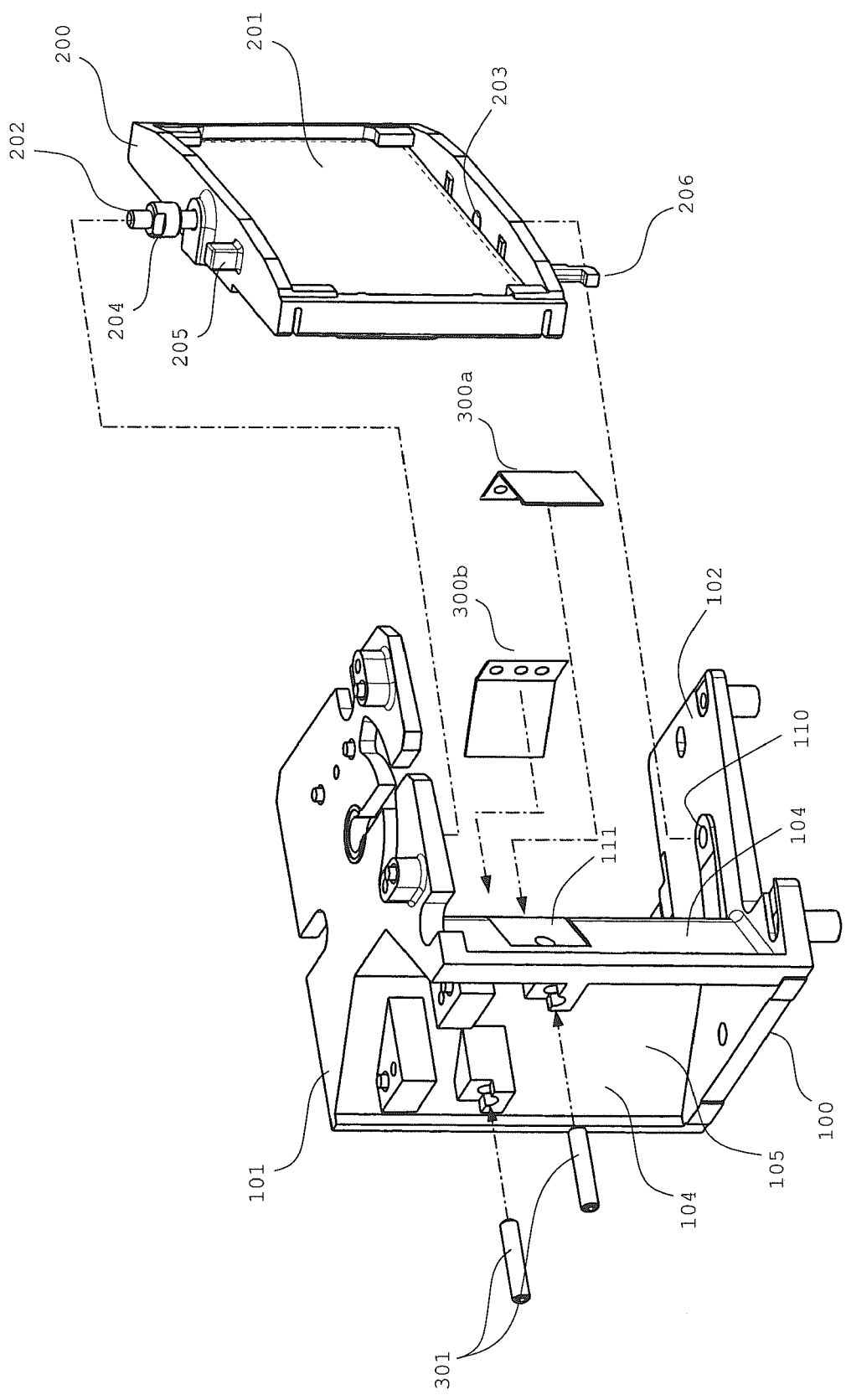
FIG. 6 is a perspective view showing a modification of an adjuster in the embodiment.

In the embodiment, the adjuster 300 integrally formed with the plate portions 300a and 300b is mounted on the base member. Alternatively, as shown in FIG. 6, the plate portions 300a and 300b may be formed as individual parts, and attached to the two wall portions 104, respectively. In this arrangement, the two plate portions 300a and 300b may not be necessarily mounted at identical height positions to each other, but may be mounted at different height positions from each other, as far as a pivotal movement of the mirror holder 200 can be properly regulated.

In the embodiment, the threading directions of the two adjusting screws 301 are made identical to each other. Alternatively, the screw holes 112 may be threaded in such a manner that the threading directions of the two adjusting screws 301 are different from each other.

Figure 7:
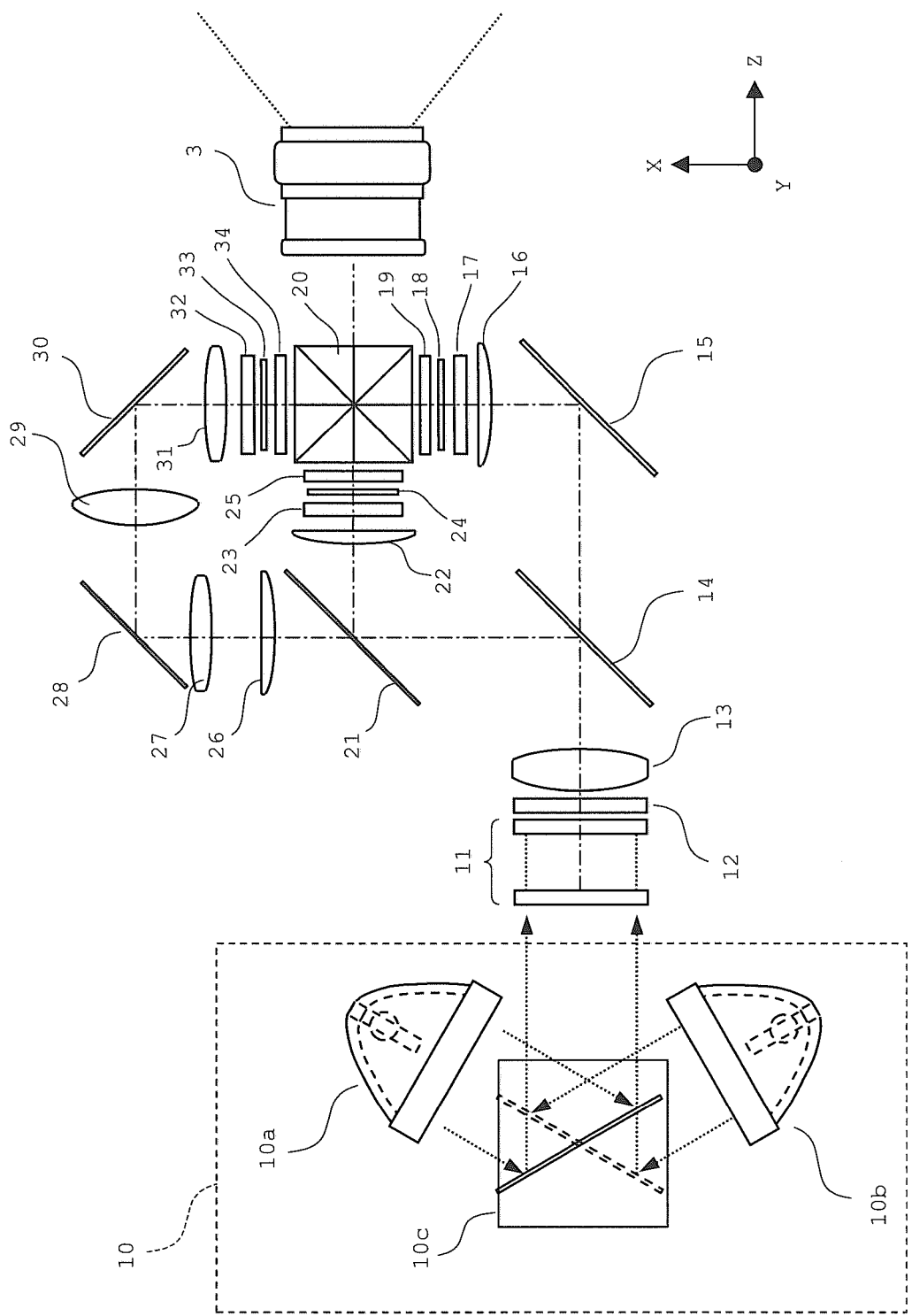
FIG. 7 is a diagram showing a modification of the optical engine in the embodiment.

In the embodiment, the optical engine 2 is configured in such a manner that the lamps 10a and 10b face to each other. Alternatively, for instance, as shown in FIG. 7, the optical engine 2 may be configured in such a manner that light from the lamp 10a, 10b is entered into the mirror unit 10c in a tilted direction with respect to X direction.

The embodiment of the present invention may be changed or modified in various ways as necessary, as far as such changes and modifications do not depart from the scope of the claims of the present invention hereinafter defined.

What is claimed is:

1. An illuminating device comprising:
    a first light source for emitting first light;
    a second light source for emitting second light, and disposed at such a position as to overlap the second light with the first light; and
    a mirror unit for pivotally supporting a mirror, wherein
    the mirror is disposed at such a position that the first light and the second light are overlapped with each other, and is pivotally moved between a first position where the first light is reflected in a targeted direction, and a second position where the second light is reflected in the targeted direction, and
    the mirror unit includes:
        a base member having an upper plate portion, a lower plate portion, and a connecting portion for connecting the upper plate portion and the lower plate portion;
        a mirror holder for holding the mirror, and pivotally supported between the upper plate portion and the lower plate portion;
        an adjuster mounted in an elastically displaceable manner on a side surface of the connecting portion on the side of the mirror holder; and
        an adjusting screw engaged with the connecting portion in such a manner that a distal end of the adjusting screw comes into contact with an elastic displacement portion of the adjuster,
        the connecting portion having two wall portions for restricting a pivotal movement of the mirror holder, and
        the adjuster being mounted on the connecting portion in such a manner that the elastic displacement portion is positioned with respect to the two wall portions.

2. The illuminating device according to claim 1, wherein the adjuster is constituted by integrally cross-linking the two elastic displacement portions to be positioned with respect to the two wall portions, respectively.

3. The illuminating device according to claim 1, wherein threading directions of the two adjusting screws to be respectively contacted with the two elastic displacement portions to be positioned with respect to the two wall portions are substantially identical to each other.

4. An image display device comprising:
    an illuminating device;
    an imager for modulating illumination light generated by the illuminating device in accordance with an image signal; and
    a light guiding optical system for guiding the illumination light from the illuminating device to the imager,
    the illuminating device including:
        a first light source for emitting first light;
        a second light source for emitting second light, and disposed at such a position as to overlap the second light with the first light; and
        a mirror unit for pivotally supporting a mirror, wherein
        the mirror is disposed at such a position that the first light and the second light are overlapped with each other, and is pivotally moved between a first position where the first light is reflected in a targeted direction, and a second position where the second light is reflected in the targeted direction, and the mirror unit includes:
- a base member having an upper plate portion, a lower plate portion, and a connecting portion for connecting the upper plate portion and the lower plate portion;
- a mirror holder for holding the mirror, and pivotally supported between the upper plate portion and the lower plate portion;
- an adjuster mounted in an elastically displaceable manner on a side surface of the connecting portion on the side of the mirror holder; and
- an adjusting screw engaged with the connecting portion in such a manner that a distal end of the adjusting screw comes into contact with an elastic displacement portion of the adjuster,
- the connecting portion having two wall portions for restricting a pivotal movement of the mirror holder, and
- the adjuster being mounted on the connecting portion in such a manner that the elastic displacement portion is positioned with respect to the two wall portions.

5. The image display device according to claim 4, wherein the adjuster is constituted by integrally cross-linking the two elastic displacement portion to be positioned with respect to the two wall portions, respectively.

6. The image display device according to claim 4, wherein threading directions of the two adjusting screws to be respectively contacted with the two elastic displacement portions to be positioned with respect to the two wall portions are substantially identical to each other.

7. A mirror unit comprising
a base member including an upper plate portion, a lower plate portion, and a connecting portion for connecting the upper plate portion and the lower plate portion;
a mirror holder for holding the mirror, and pivotally supported between the upper plate portion and the lower plate portion;
an adjuster mounted in an elastically displaceable manner on a side surface of the connecting portion on the side of the mirror holder; and
an adjusting screw engaged with the connecting portion in such a manner that a distal end of the adjusting screw comes into contact with an elastic displacement portion of the adjuster, wherein
the connecting portion has two wall portions for restricting a pivotal movement of the mirror holder, and
the adjuster is mounted on the connecting portion in such a manner that the elastic displacement portion is positioned with respect to the two wall portions.

8. The mirror unit according to claim 7, wherein
the adjuster is constituted by integrally cross-linking the two elastic displacement portions to be positioned with respect to the two wall portions, respectively.

9. The mirror unit according to claim 7, wherein
threading directions of the two adjusting screws to be respectively contacted with the two elastic displacement portions to be positioned with respect to the two wall portions are substantially identical to each other.

* * * * *